June 5, 1951          R. T. DUNHAM          2,555,477
PRESSURE RELEASE DEVICE FOR CREAM CANS
Filed Oct. 21, 1949
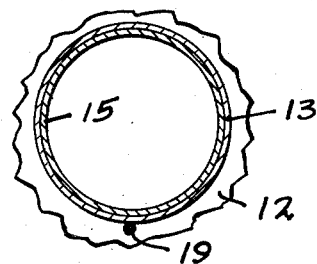
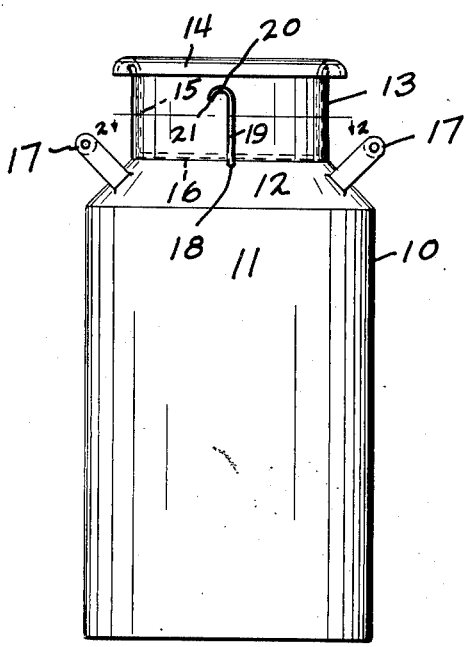
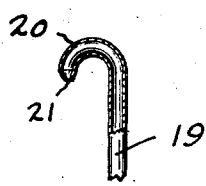
INVENTOR
Rex T. Dunham
By Sam J. Slotsky
ATTORNEY Patented June 5, 1951

2,555,477

UNITED STATES PATENT OFFICE 2,555,477

PRESSURE RELEASE DEVICE FOR CREAM CANS

Rex T. Dunham, South Sioux City, Nebr.

Application October 21, 1949, Serial No. 122,720

1 Claim. (Cl. 220—85)

My invention relates to cream cans.

An object of my invention is to provide an arrangement for releasing the pressure generated by fermenting cream in cream cans, so that such pressure will not blow or force out the cream can cover, which action would cause loss of cream, as well as other objectionable features.

A further object of my invention is to provide a simple method of releasing the fermentation gases through a certain tubular arrangement wherein there will be no danger of dirt or other particles falling into the can, and wherein such tubular arrangement will be completely out of the way, and at a point wherein the entrapped pressure is released most efficiently.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a side elevation of a cream can with my arrangement attached thereto, Figure 2 is a sectional view taken substantially along the lines 2—2 of Figure 1, and Figure 3 is a detail.

I have found that it is a very common occurrence for cream can covers to be blown outwardly due to the pressure developed by fermentation caused by bacterial agents, such effect in some cases being even harmful, and also causing a fairly considerable waste of cream which is blown out of the can. My invention contemplates a simple structure wherein the pressure generated within the can is constantly released so that such pressures can not be developed beyond the danger point.

I have used the character 10 to designate the cream can generally which can includes the cylindrical side walls 11, the sloping wall 12 and the neck 13. Received within the neck 13 is the cover or lid 14 having the depressed cylindrical wall 15 and bottom 16. The character 17 designates the carrying handles.

Attached at 18 to the wall 12 is the open lower end of a small diameter tube 19 which extends upwardly just outside of the neck 13 and terminates in the downwardly curved portion 20 which portion terminates in the reduced open end 21, which open end can be covered with a screen if such is desired, although this is not essential. The tube 19 can also be attached to the neck 13 for rigidity.

It will be noted that the connection of the tube 19 at 18 is slightly beneath the bottom of the wall 16 of the lid, so that the gas pressures generated in the can will pass out through the tube 19 and the opening 21 thereby relieving the dangerous pressures within the can. The downwardly turned portion 20 assists to prevent ingress of undesirable particles, although normally the opening 21 can be made small enough to prevent the same.

It will be understood that other shapes of tubes and the like can be used without departing from the spirit of my invention.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

In combination with a cream can of the type having a reduced neck portion merging with a sloping wall portion, an opening in said sloping wall portion, a tube communicating with said opening for releasing pressure generated in said can, said tube having a downwardly bent upper portion, and said tube being directly adjacent to said neck portion.

REX T. DUNHAM.

REFERENCES CITED

The following references are of record in the file of this patent:

UNITED STATES PATENTS

| Number | Name | Date |
|---|---|---|
| 857,517 | Demory | June 18, 1907 |
| 1,442,525 | Howard | Jan. 16, 1923 |
| 1,625,287 | Snow | Apr. 19, 1927 |
| 2,000,862 | Nichols | May 7, 1935 |
| 2,371,296 | Hopwood | May 13, 1945 |